US012571615B2

(12) United States Patent
Riley

(10) Patent No.: US 12,571,615 B2
(45) Date of Patent: Mar. 10, 2026

(54) SMART PERSONAL SAFETY DEVICES, SYSTEMS, AND METHODS

(71) Applicant: Security Equipment Corporation, Fenton, MO (US)

(72) Inventor: Louis F. Riley, Conway, AR (US)

( * ) Notice: Subject to any disclaimer, the term of this patent is extended or adjusted under 35 U.S.C. 154(b) by 11 days.

(21) Appl. No.: 18/736,985

(22) Filed: Jun. 7, 2024

(65) Prior Publication Data

US 2025/0044064 A1     Feb. 6, 2025

Related U.S. Application Data

(60) Provisional application No. 63/516,580, filed on Jul. 31, 2023.

(51) Int. Cl.
*F41H 9/10* (2006.01)
*G08B 15/00* (2006.01)
(Continued)

(52) U.S. Cl.
CPC ............. *F41H 9/10* (2013.01); *G08B 15/004* (2013.01); *G08B 21/02* (2013.01); *G08B 25/016* (2013.01);
(Continued)

(58) Field of Classification Search
CPC ......... F41H 9/10; G08B 25/016; G08B 25/10; G08B 25/12; G08B 15/004; H04W 4/80; H04W 4/90
See application file for complete search history.

(56) References Cited

U.S. PATENT DOCUMENTS 3,443,333 A     5/1969  Manatos
4,044,922 A     8/1977  Bordelon
(Continued)

FOREIGN PATENT DOCUMENTS

| DE | 102019001766 A1 | 9/2020 |
| GB | 2568870 | 6/2019 |
| WO | 9731218 | 8/1997 |
| WO | 2011045468 | 4/2011 |
| WO | 2019119103 | 6/2019 |

OTHER PUBLICATIONS

Guard Dog Light em Up—Self-Defense Combo w/Red Pepper Spray & Flashlight, Amazon Page, Dated Sep. 3, 2021 (1 Page).
Guard Dog Light em Up—Self-Defense Combo w/Red Pepper Spray & Flashlight, Maximum Strength, Amazon Page, Dated Jan. 30, 2024 (9 Pages).

*Primary Examiner* — John A Tweel, Jr.

(74) *Attorney, Agent, or Firm* — Hartman Global IP Law; Gary M. Hartman; Domenica N. S. Hartman

(57)     ABSTRACT

Smart personal safety device, system, and method. A personal safety device for dispensing a chemical irritant includes a body for receiving a product cannister, a first actuation mechanism for dispensing product from a product cannister received within the body, and a wireless data communication module coupled to the body for wirelessly transmitting a triggering signal to a remote receiver when the first actuation mechanism is actuated to dispense product from a product cannister received within the body. The wireless data communication module is separable from the body. The wireless data communication module includes a second actuation mechanism configured to actuate the data communication module when the wireless data communication module is separated from the body. The personal safety device can be incorporated into a personal safety system that can send an emergency alert signal to third parties when the chemical irritant is dispensed.

18 Claims, 7 Drawing Sheets

(51) Int. Cl.

| | | |
|---|---|---|
| *G08B 21/02* | (2006.01) | |
| *G08B 25/01* | (2006.01) | |
| *G08B 25/10* | (2006.01) | |
| *G08B 25/12* | (2006.01) | |
| *H04W 4/80* | (2018.01) | |
| *H04W 4/90* | (2018.01) | |

(52) U.S. Cl.
CPC ............. *G08B 25/10* (2013.01); *G08B 25/12* (2013.01); *H04W 4/80* (2018.02); *H04W 4/90* (2018.02)

(56) References Cited

U.S. PATENT DOCUMENTS

| | | | |
|---|---|---|---|
| 4,220,263 | A | 9/1980 | Caruso |
| 4,301,947 | A | 11/1981 | Potter |
| 4,434,914 | A | 3/1984 | Meshberg |
| 4,454,966 | A | 6/1984 | Hicks |
| 4,477,005 | A | 10/1984 | Martinez |
| 4,667,851 | A | 5/1987 | Wilkerson |
| 5,088,121 | A | 2/1992 | Wallace |
| 5,287,995 | A | 2/1994 | Redman et al. |
| 5,310,086 | A | 5/1994 | Julinot |
| 5,348,193 | A | 9/1994 | Bruckner et al. |
| 5,392,975 | A | 2/1995 | Blankenship, Jr. |
| 5,420,766 | A | 5/1995 | Hollis |
| D364,669 | S | 11/1995 | Winner |
| 5,476,192 | A | 12/1995 | Julinot |
| D375,994 | S | 11/1996 | Collins et al. |
| D376,766 | S | 12/1996 | Cranford et al. |
| 5,629,679 | A | 5/1997 | Cranford et al. |
| 5,683,168 | A | 11/1997 | Teig et al. |
| 5,893,483 | A | 4/1999 | Duran |
| 5,949,338 | A | 9/1999 | Masi et al. |
| 5,971,240 | A | 10/1999 | Dequaine |
| 5,988,450 | A | 11/1999 | Cassarino |
| 6,145,654 | A | 11/2000 | Loghman |
| D435,081 | S | 12/2000 | Hsu |
| 6,196,419 | B1 | 3/2001 | Haney et al. |
| 6,199,726 | B1 | 3/2001 | Cardwell, III et al. |
| D469,014 | S | 1/2003 | Loghman-Adham et al. |
| D501,311 | S | 2/2005 | Passmore |
| 6,957,750 | B1 | 10/2005 | Trudell |
| 6,981,616 | B2 | 1/2006 | Loghman-Adham et al. |
| 7,121,432 | B2 | 10/2006 | Kostal et al. |
| 7,121,434 | B1 | 10/2006 | Caruso |
| 7,178,696 | B2 | 2/2007 | Larsen et al. |
| D555,838 | S | 11/2007 | Robertson |
| D573,223 | S | 7/2008 | Kostal et al. |
| D585,520 | S | 1/2009 | Teig |
| D585,955 | S | 2/2009 | Gamma |
| D619,196 | S | 7/2010 | Cardwell, III et al. |
| D636,050 | S | 4/2011 | Kaufman |
| D642,376 | S | 8/2011 | Pennington |
| D657,551 | S | 4/2012 | Lynn |
| 8,147,089 | B2 * | 4/2012 | Matthews ............... F21L 4/027 |
| | | | 362/198 |
| 8,245,878 | B2 | 8/2012 | Smith et al. |
| 8,310,360 | B2 | 11/2012 | Ross, Jr. et al. |
| 8,313,009 | B2 | 11/2012 | Parisi et al. |
| D681,768 | S | 5/2013 | Ross, Jr. et al. |
| 8,472,915 | B2 | 6/2013 | DiPerna et al. |
| 8,499,974 | B2 | 8/2013 | Bennett |
| 8,556,125 | B2 | 10/2013 | Dapper |
| D696,857 | S | 1/2014 | Atteberry et al. |
| 8,690,020 | B1 | 4/2014 | Murray |
| D712,502 | S | 9/2014 | Olson |
| D713,922 | S | 9/2014 | Sheikh et al. |
| 8,935,940 | B1 | 1/2015 | Lough |
| D723,131 | S | 2/2015 | Habermann et al. |
| 8,985,397 | B2 | 3/2015 | Lord |
| D728,063 | S | 4/2015 | Hwang |
| D731,172 | S | 6/2015 | Atteberry et al. |
| 9,199,784 | B2 | 12/2015 | Caruso |
| 9,216,853 | B2 | 12/2015 | Caruso |
| 9,257,026 | B2 | 2/2016 | Kalina |
| 9,267,767 | B2 | 2/2016 | Hwang |
| 9,354,024 | B1 | 5/2016 | Perry |
| 9,395,077 | B2 | 7/2016 | Flynn |
| 9,423,208 | B1 | 8/2016 | Mahmalji |
| 9,586,750 | B1 | 3/2017 | Mangold |
| 9,605,930 | B2 | 3/2017 | Ben Yair et al. |
| 9,615,235 | B2 * | 4/2017 | Scully ..................... H04W 4/90 |
| 9,691,244 | B2 | 6/2017 | Weng |
| 9,715,805 | B1 | 7/2017 | Scully et al. |
| D800,446 | S | 10/2017 | Sheikh et al. |
| 9,815,612 | B1 | 11/2017 | Caruso |
| 9,864,211 | B2 * | 1/2018 | Belbey .................. G02C 11/10 |
| 9,883,022 | B2 | 1/2018 | Barnes et al. |
| 9,922,537 | B2 | 3/2018 | Shah et al. |
| 9,927,213 | B2 | 3/2018 | Komperda |
| D818,076 | S | 5/2018 | Sheikh |
| 10,054,305 | B1 | 8/2018 | Slepack |
| D829,297 | S | 9/2018 | Sheikh |
| 10,139,101 | B2 | 11/2018 | Pires |
| 10,144,563 | B1 | 12/2018 | Caruso |
| D838,337 | S | 1/2019 | Frisk |
| 10,175,032 | B2 | 1/2019 | Cooper |
| 10,197,358 | B2 | 2/2019 | Hebden et al. |
| 10,230,827 | B2 | 3/2019 | DiPerna et al. |
| 10,247,524 | B1 | 4/2019 | Caruso |
| 10,254,077 | B2 | 4/2019 | Crandall |
| 10,309,753 | B2 | 6/2019 | Forsythe et al. |
| 10,429,153 | B2 | 10/2019 | Gorham |
| 10,479,592 | B1 | 11/2019 | Caruso |
| 10,502,519 | B2 | 12/2019 | Stilson |
| 10,520,282 | B2 | 12/2019 | Nangunoori |
| 10,634,460 | B1 | 4/2020 | Sheikh |
| D886,232 | S | 6/2020 | Patton |
| D887,520 | S | 6/2020 | Nance et al. |
| 10,694,794 | B2 | 6/2020 | Komperda |
| D890,287 | S | 7/2020 | Hymowitz |
| 10,712,126 | B2 * | 7/2020 | Crist ..................... F41A 17/063 |
| D892,628 | S | 8/2020 | Caruso |
| 10,731,845 | B2 | 8/2020 | Harvey |
| 10,921,097 | B1 | 2/2021 | Rojas |
| 10,996,028 | B2 | 5/2021 | Jimenez |
| 11,022,406 | B2 | 6/2021 | Rice |
| 11,071,364 | B1 | 7/2021 | Fowler |
| D941,951 | S | 1/2022 | Crilley |
| 11,287,225 | B2 | 3/2022 | Bogacz et al. |
| 11,320,233 | B2 | 5/2022 | Clemons et al. |
| 11,402,179 | B2 | 8/2022 | Nance et al. |
| 11,413,478 | B2 | 8/2022 | Bina et al. |
| 11,478,229 | B1 | 10/2022 | Casali |
| 11,519,700 | B2 | 12/2022 | Clemons et al. |
| 11,573,067 | B1 | 2/2023 | Faircloth, Jr. |
| D1,012,222 | S | 1/2024 | Riley |
| D1,012,223 | S | 1/2024 | Riley |
| 2008/0167092 | A1 | 7/2008 | Ueda et al. |
| 2011/0288680 | A1 | 11/2011 | Samain et al. |
| 2012/0316381 | A1 | 12/2012 | Teggatz et al. |
| 2013/0105518 | A1 | 5/2013 | McPherson et al. |
| 2013/0112771 | A1 | 5/2013 | Ki et al. |
| 2015/0069082 | A1 | 3/2015 | Breeden |
| 2015/0312399 | A1 | 10/2015 | Teig |
| 2015/0327092 | A1 | 11/2015 | Martch |
| 2016/0039582 | A1 | 2/2016 | Hui et al. |
| 2017/0087576 | A1 | 3/2017 | Fang et al. |
| 2018/0087769 | A1 | 3/2018 | Pires |
| 2022/0151346 | A1 | 5/2022 | Wu |

\* cited by examiner

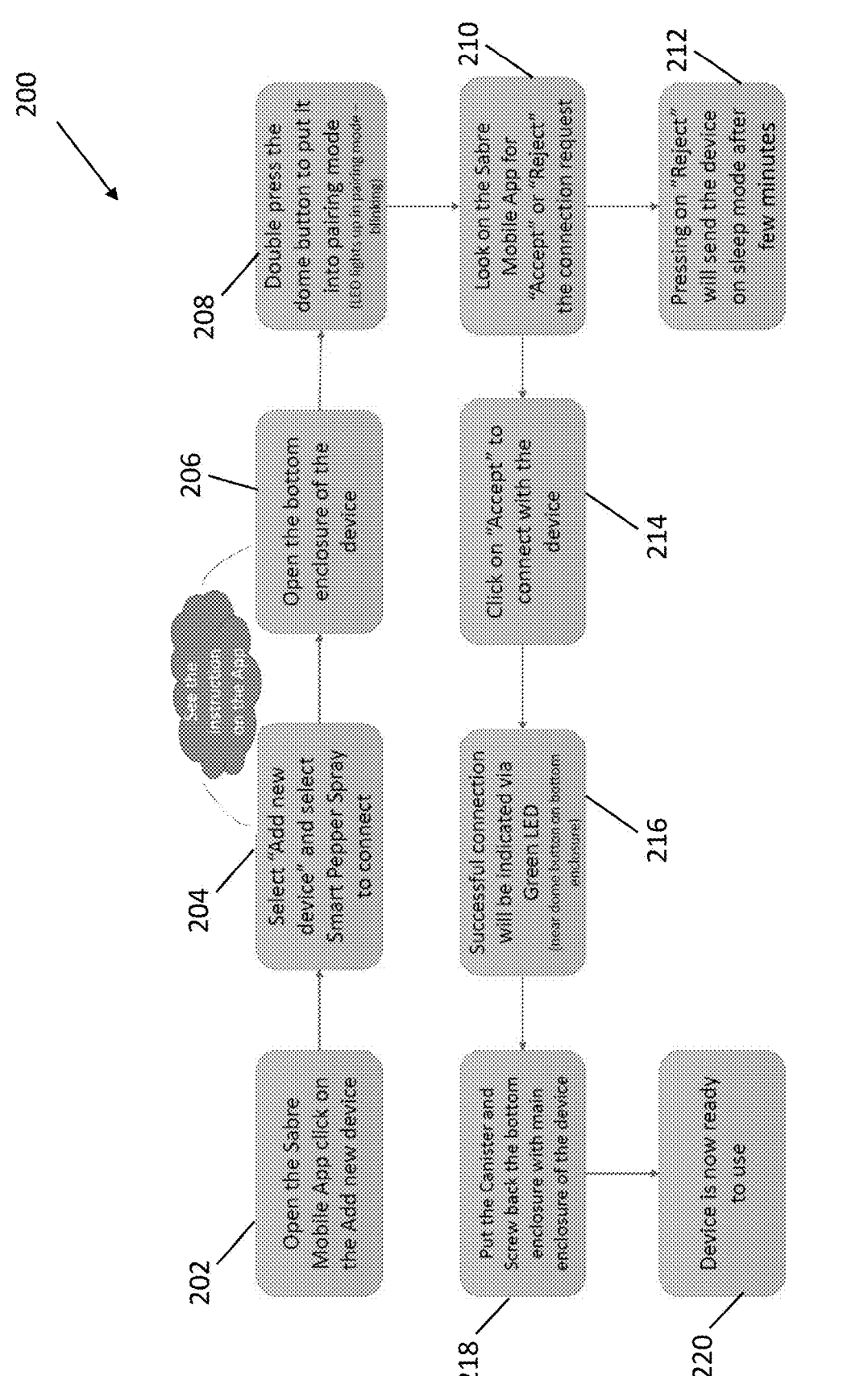

200

202 Open the Sabre Mobile App click on the Add new device

204 Select "Add new device" and select Smart Pepper Spray to connect

206 Open the bottom enclosure of the device

208 Double press the dome button to put it into pairing mode (LED light will start blinking)

210 Look on the Sabre Mobile App for "Accept" or "Reject" the connection request 212 Pressing on "Reject" will send the device on sleep mode after few minutes 214 Click on "Accept" to connect with the device 216 Successful connection will be indicated via Green LED (near dome button on bottom enclosure)

218 Put the Canister and Screw back the bottom enclosure with main enclosure of the device 220 Device is now ready to use

FIG. 4

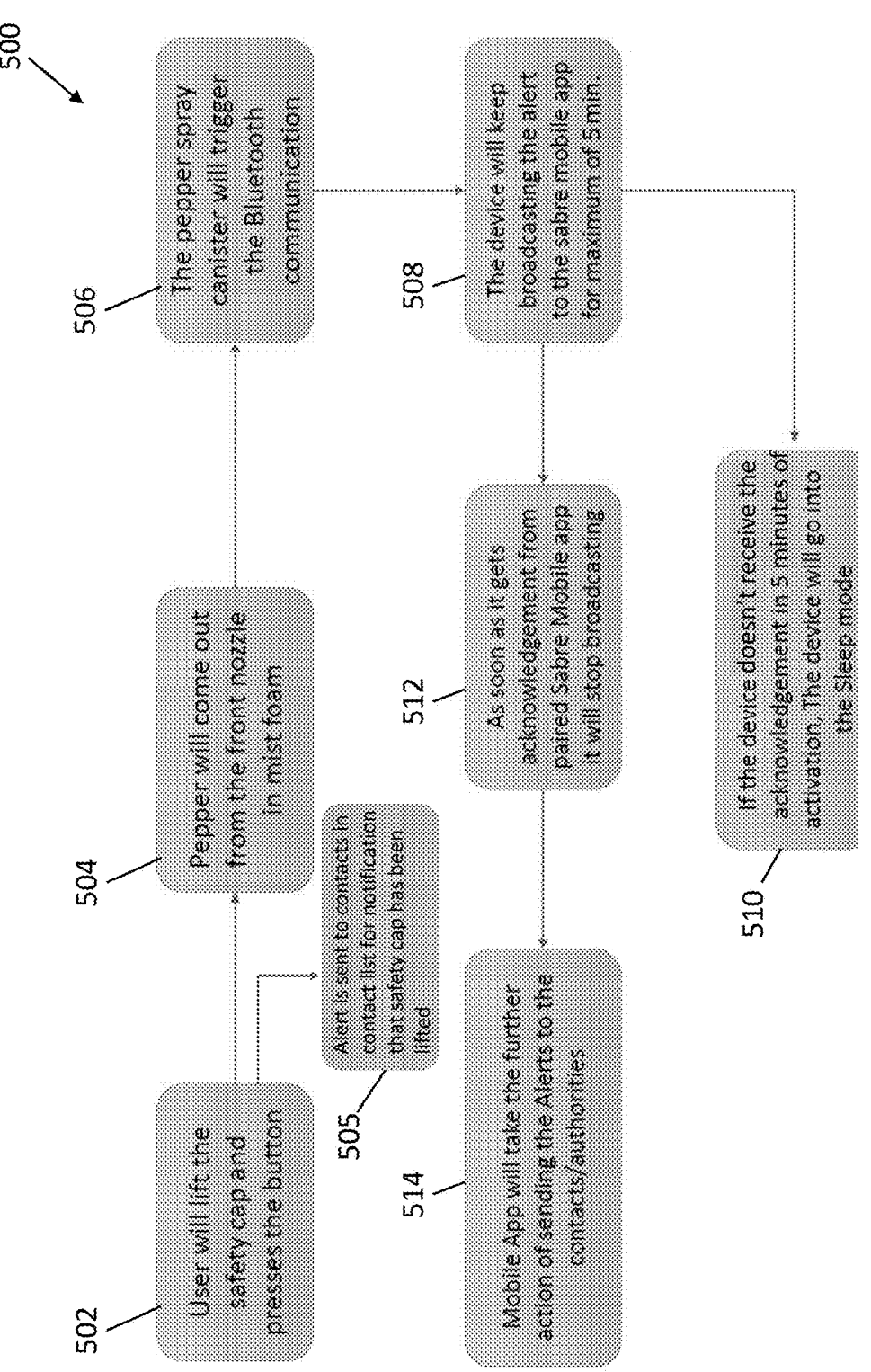

500

502 User will lift the safety cap and presses the button

504 Pepper will come out from the front nozzle in mist foam

505 Alert is sent to contacts in contact list for notification that safety cap has been lifted 506 The pepper spray canister will trigger the Bluetooth communication 508 The device will keep broadcasting the alert to the sabre mobile app for maximum of 5 min 510 If the device doesn't receive the acknowledgement in 5 minutes of activation. The device will go into the Sleep mode 512 As soon as it gets acknowledgement from paired Sabre Mobile app it will stop broadcasting 514 Mobile App will take the further action of sending the Alerts to the contacts/authorities

FIG. 7

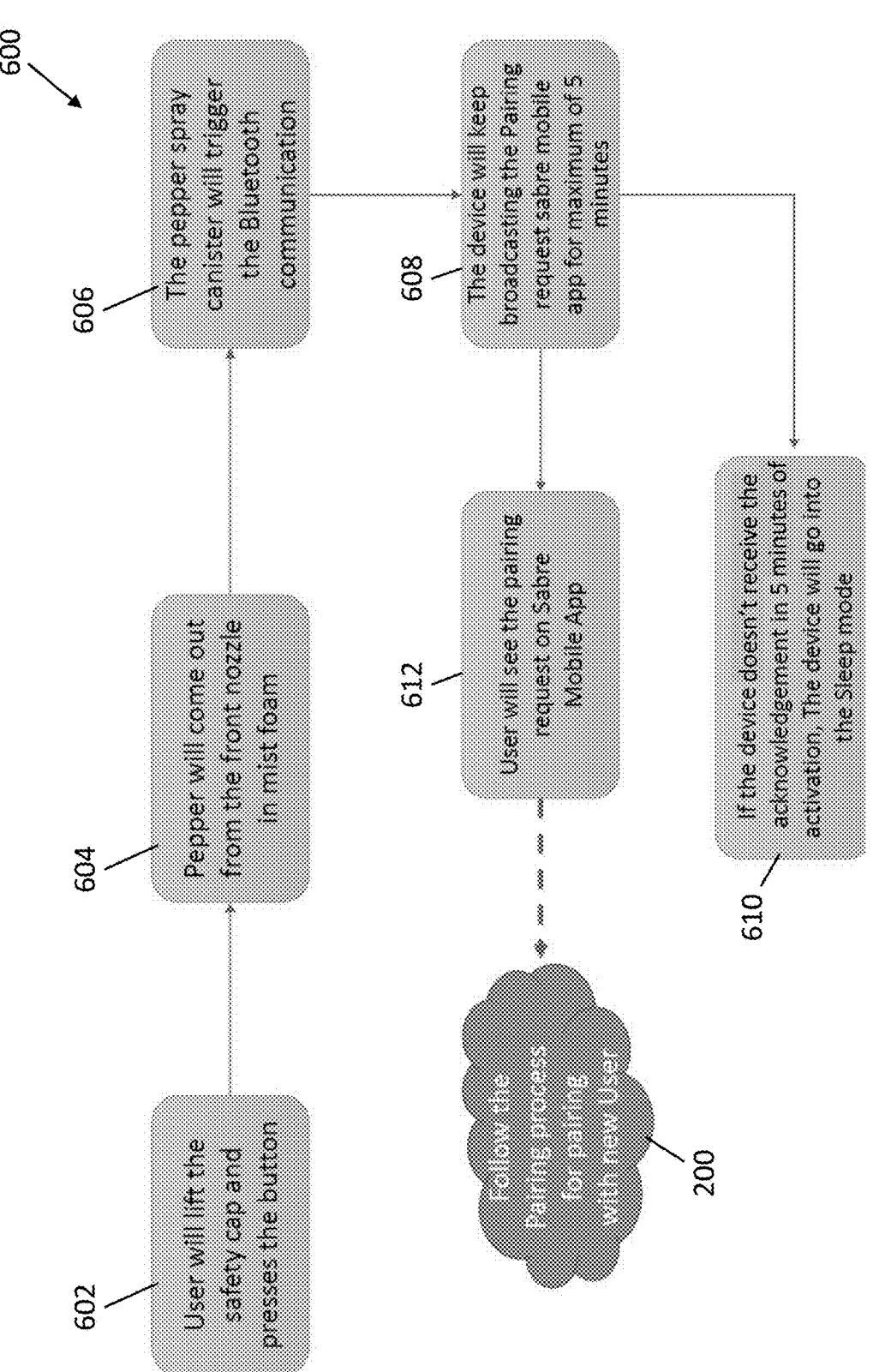

600

602 — User will lift the safety cap and presses the button

604 — Pepper will come out from the front nozzle in mist foam

606 — The pepper spray canister will trigger the Bluetooth communication

608 — The device will keep broadcasting the Pairing request sabre mobile app for maximum of 5 minutes 610 — If the device doesn't receive the acknowledgement in 5 minutes of activation, The device will go into the Sleep mode 612 — User will see the pairing request on Sabre Mobile App

SMART PERSONAL SAFETY DEVICES, SYSTEMS, AND METHODS

CROSS-REFERENCE TO RELATED APPLICATIONS

This application claims the benefit of U.S. Provisional Application No. 63/516,580, filed Jul. 31, 2023, the contents of which are incorporated herein by reference.

BACKGROUND OF THE INVENTION

The invention generally relates to personal safety devices. More particularly, the present invention is directed to personal safety devices with a separable wireless data communication module, smart personal safety systems incorporating such a smart personal safety device, and methods generally related thereto.

If a person is threatened (or feels threatened) by an actual or perceived assailant, it is well known to have an easily portable and actuatable device that dispenses a chemical irritant, such as pepper spray, to ward of the perceived or actual threat. However, such attacks often occur in areas where there are no other people or help in the immediate vicinity, which continues to leave the victim vulnerable if, for example, other attackers are also present or the victim misses the intended target. Therefore, it would be desirable to have a personal safety device that dispenses a chemical irritant and simultaneously sends out an emergency signal to one or more third parties that may be able to come to the scene and provide additional protection to the victim.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, smart personal safety devices, smart personal safety systems, and methods of using such a device and/or system.

According to a nonlimiting aspect, a personal safety device for dispensing a chemical irritant includes a body for receiving a product cannister, a first actuation mechanism for dispensing product from a product cannister received within the body, and a wireless data communication module coupled to the body for wirelessly transmitting a triggering signal to a remote receiver when the first actuation mechanism is actuated to dispense product from a product cannister received within the body. The wireless data communication module is separable from the body. The wireless data communication module includes a second actuation mechanism configured to actuate the data communication module when the wireless data communication module is separated from the body.

According to another nonlimiting aspect, a personal safety system includes a personal safety device having aspects as described above, and a mobile computing device that can establish a dedicated wireless communication link with the wireless data communication module of the personal safety device. The mobile computing device executes a program configured to send an alert signal to one or more third parties via a telecommunications and/or data network in response to receiving an emergency triggering signal from the wireless data communication module over the established dedicated wireless communication link.

According to still another nonlimiting aspect, a method of using a personal safety device having aspects as described above includes separating the wireless data communication module from the body, and actuating the second actuation mechanism to send an emergency alert signal over an established dedicated communication link with a mobile computing device while the wireless data communication module is separated from the body.

Technical aspects of personal safety devices, personal safety systems, and/or methods as described above preferably include the ability of providing a more versatile and/or effective capability to call for help from a third party when using a pepper spray or other personal safety device that dispenses a chemical irritant, thereby increasing the chances of a user receiving assistance in an emergency situation.

These and other aspects, arrangements, features, and/or technical effects will become apparent upon detailed inspection of the figures and the following description.

BRIEF DESCRIPTION OF THE DRAWINGS

FIG. 4 is a flow chart illustrating steps in a pairing process for the wireless data communication module of the smart personal safety device of FIG. 1.

FIG. 7 is a flow chart illustrating steps in a process of using the smart personal safety device of FIG. 1 in a paired state.

FIG. 8 is a flow chart illustrating steps in a process of using the smart personal safety device of FIG. 1 in an unpaired state.

DETAILED DESCRIPTION OF THE INVENTION

Figure 2:
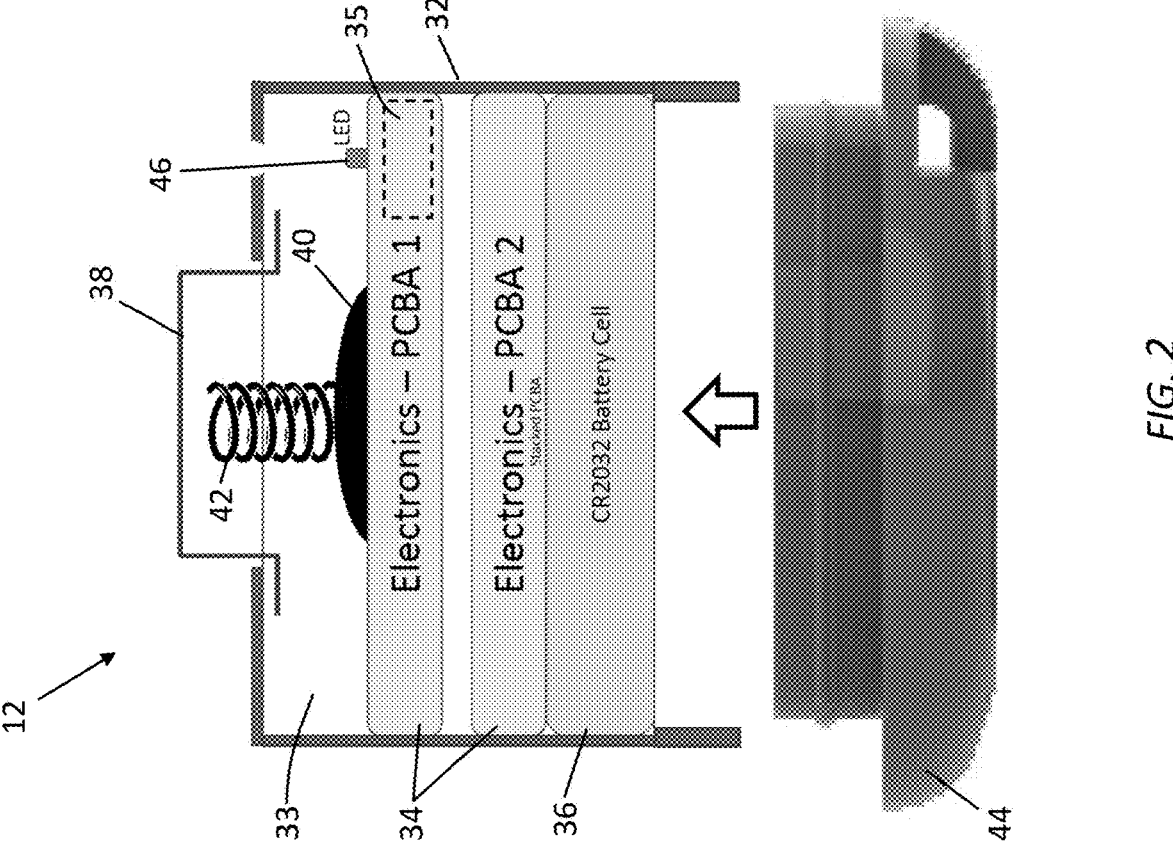
FIG. 2 is an enlarged diagrammatic cross-sectional view of a wireless data communication module of the smart personal safety device of FIG. 1.

The intended purpose of the following detailed description of the invention and the phrascology and terminology employed therein is to describe what is shown in the drawings, which include the depiction of and/or relate to one or more nonlimiting embodiments of the invention, and to describe certain but not all aspects of what is depicted in the drawings, including the embodiment(s) to which the drawings relate. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments.

Therefore, the appended claims, and not the detailed description, are intended to particularly point out subject matter regarded to be aspects of the invention, including certain but not necessarily all of the aspects and alternatives described in the detailed description.

Although the invention will be described hereinafter in reference to a pepper spray dispenser 10 schematically represented in the drawings, it will be appreciated that the teachings of the invention are more generally applicable to a variety of types of personal safety devices that dispense a chemical irritant.

To facilitate the description provided below of the embodiment(s) represented in the drawings, relative terms, including but not limited to, "proximal," "distal," "anterior," "posterior," "vertical," "horizontal," "lateral," "front," "rear," "side," "forward," "rearward," "top," "bottom," "upper," "lower," "above," "below," "right," "left," etc., may be used in reference to the orientation of the personal safety device 10 during its use and/or as represented in the drawings. All such relative terms are useful to describe the illustrated embodiment(s) but should not be otherwise interpreted as limiting the scope of the invention.

Figure 1:
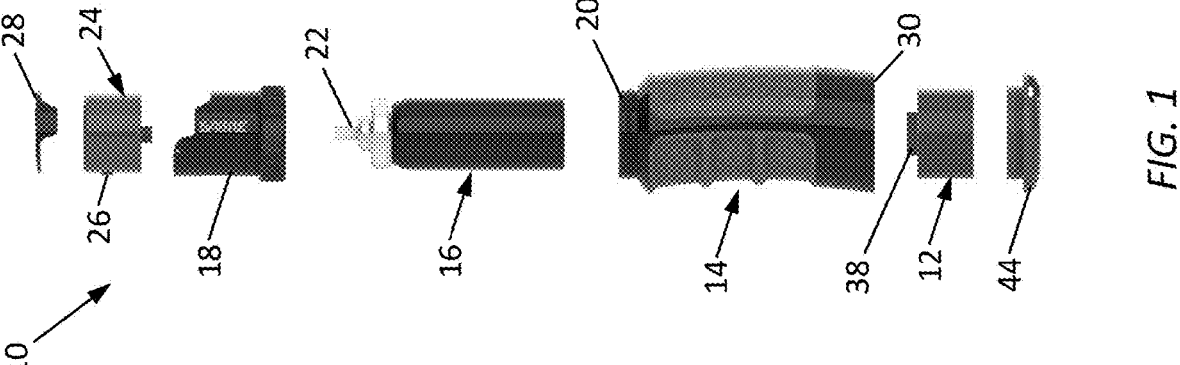
FIG. 1 is an exploded view of a smart personal safety device according to a nonlimiting embodiment of the present invention.

Turning now to the nonlimiting embodiments represented in the drawings, FIG. 1 depicts the personal safety device 10 as configured for dispensing a chemical irritant. The device 10 is referred to herein as a "smart" personal safety device 10 that is equipped with a separable wireless data communication module 12 according to nonlimiting embodiments of the present invention. The personal safety device 10 in this example is in the form of a pepper spray dispenser, and the wireless data communication module 12 includes a short-range radio frequency transmitter/receiver (transceiver), such as a Bluetooth® transceiver. However, the invention is not necessarily limited to pepper spray and/or a Bluetooth transceiver, and other types of personal safety devices and/or wireless data communication technology could be used. For example, the chemical irritant could include another chemical irritant and/or the wireless data communication module 12 could include an FM radio transmitter or another type of wireless data transmitter.

The personal safety device 10 includes a body 14 with a cavity (not shown) that is sized and configured to receive a product cannister 16 therein. The product cannister 16 contains a chemical irritant, such as a pepper spray gel or other irritant, for dispensing by the personal safety device 10. In this example, the product cannister 16 is pressurized and includes a dispensing assembly 22, such as a conventional aerosol valve that dispenses the chemical irritant when depressed. The device 10 includes a top cap 18 adapted to couple with a top rim 20 of the body 14. The top cap 18 retains the cannister 16 in the cavity inside the body 14 without actuating the dispensing assembly 22. A dispensing button 24 is retained within and preferably by the top cap 18 and configured to actuate the dispensing assembly 22 when pressed by a user. In this example, the dispensing button 24 includes a spray nozzle 26 and an internal spray conduit (not shown) that is fluidically coupled to the nozzle 26 and is fluidically coupled with the dispensing assembly 22 of the cannister 16 when the cap 18 is coupled with the rim 20 of the body 14 so that product within the cannister 16 is dispensed through the dispensing assembly 22 and internal spray conduit and subsequently expelled in a radially outward direction through the spray nozzle 26. A protective (safety) cap 28 covers the dispensing button 24 to prevent unwanted and/or accidental actuation of the dispensing button 24, and thereby prevent unwanted and/or accidental dispensing of the chemical irritant from the cannister 16. To dispense the chemical irritant, a user grips the body 14 with his/her fingers wrapped around the body 14 and nested within finger grooves on the exterior of the body 14. The user then disengages the protective cap 28 and presses the dispensing button 24 downwardly in the cap 18 to actuate the dispensing assembly 22. When so actuated, a chemical irritant inside the cannister 16 is released from the cannister 16 through the dispensing assembly 22 and expelled through the spray nozzle 26.

The wireless data communication module 12 releasably attaches (mounts) to a lower end 30 of the body 14 opposite the rim 20, for example with a threaded coupling, a press-fit connection, a snap-fit coupling, or any other type of coupling that allows the data communication module 12 to be easily and securely attached to the body 14 and also allow the data communication module 12 to be easily and quickly removed from the body 14 by a user when so desired. As best seen in FIG. 2, the data communication module 12 includes an electronics housing 32 adapted to releasably mount to the lower end 30 of the body 14. Electronic circuitry 34 and a power cell 36 are contained within an enclosure 33 defined within the housing 32. The power cell 36 may include a battery (such as the CR2032 battery cell represented in FIG. 2), capacitor, and/or other type of electrical storage device. In the nonlimiting embodiment shown in FIG. 2, the electronic circuitry 34 is represented as two printed circuit board assemblies (PCBAs) in a stacked configuration inside the housing 32 between the power cell 36 near the lower end of the housing 32 and a push button 38 at an upper end of the housing 32. In embodiments in which the wireless data communication module 12 has a Bluetooth® communication capability, at least one of the PCBAs of the electronic circuitry 34 includes a Bluetooth® transmitter/receiver (transceiver) 35 or other type of short-range radio transceiver that can wireless pair and communicate with a mobile telephone or other digital computing device. The lower end of the housing 32 is represented as being closable with a removable closure 44 that when removed selectively allows access to the interior of the enclosure 33 and to the power cell 36 within the enclosure 33, for example, when it is necessary to replace the power cell 36, and thereafter reinstalled on the housing 32 to enclose the power cell 36 within the housing 32. As will be discussed below, FIG. 2 further represents the module 12 as including a pairing indicator 46 that is visible, such as through an opening at the upper end of the housing 32 adjacent the button 38.

The push button 38 is shown as projecting upwardly through an opening at the upper end of the electronics housing 32 such that the button 38 can be engaged and actuated in a downward direction (toward/into the housing 32) to energize the circuitry 34 and operate the wireless data communication module 12. The button 38 is preferably configured to be capable of being actuated in cases when the wireless data communication module 12 is mounted to the lower end 30 of the body 14 as well as when the module 12 is removed from the body 14. More particularly, the button 38 can preferably be indirectly actuated by a user pressing on the dispensing button 24 of the device 10 when the wireless data communication module 12 is mounted to the lower end 30 of the body 14, so that the module 12 is simultaneously energized when the chemical irritant is intended to be dispensed from the cannister 16 within the body 14. Additionally, the button 38 can preferably be directly actuated by a user pressing on the button 38 after the wireless data communication module 12 has been removed from the body 14. A dome switch (dome button switch) 40 is represented as disposed on the upper-most PCBA of the circuitry 34, and a biasing member 42 (represented as a coil spring) is operatively disposed between the dome switch 40 and push button 38 to bias the push button 38 and the dome switch 40 away from each other. By interposing the biasing member 42 between the push button 38 and the dome switch 40, when the push button 38 is depressed, an amount of spring force of the biasing member 42 must be overcome before the dome switch 40 is closed (switched). As such, the cannister 16 within the body 14 is able to resiliently engage against the push button 38 when the wireless data communications module 12 is mounted to the body 14 without actuating the dome switch 40 while the dispensing button 24 is not depressed to dispense the chemical irritant from within the cannister 16. On the other hand, when the dispensing button 24 is depressed to dispense the chemical irritant, the cannister 16 is actuated downward within the body 14 so as to press down against the push button 38 with sufficient force to overcome the spring force of the biasing member 42 and thereby actuate and close the dome switch 40. Advantageously, the push button 38 is enclosed in and/or between the body 14 and the electronics housing 32 when the wireless data communication module 12 is mounted to the lower end 30 of the body 14, which prevents the push button 38 from being directly depressed and accidently engaged, for example, by a user's finger or within a purse or briefcase. Rather, when so mounted, the wireless data communication module 12 can only be engaged (e.g., switched on or off) by depressing the dispensing button 24 to an extent sufficient to open the dispensing assembly 22 and dispense the chemical irritant from the cannister 16.

Figure 3:
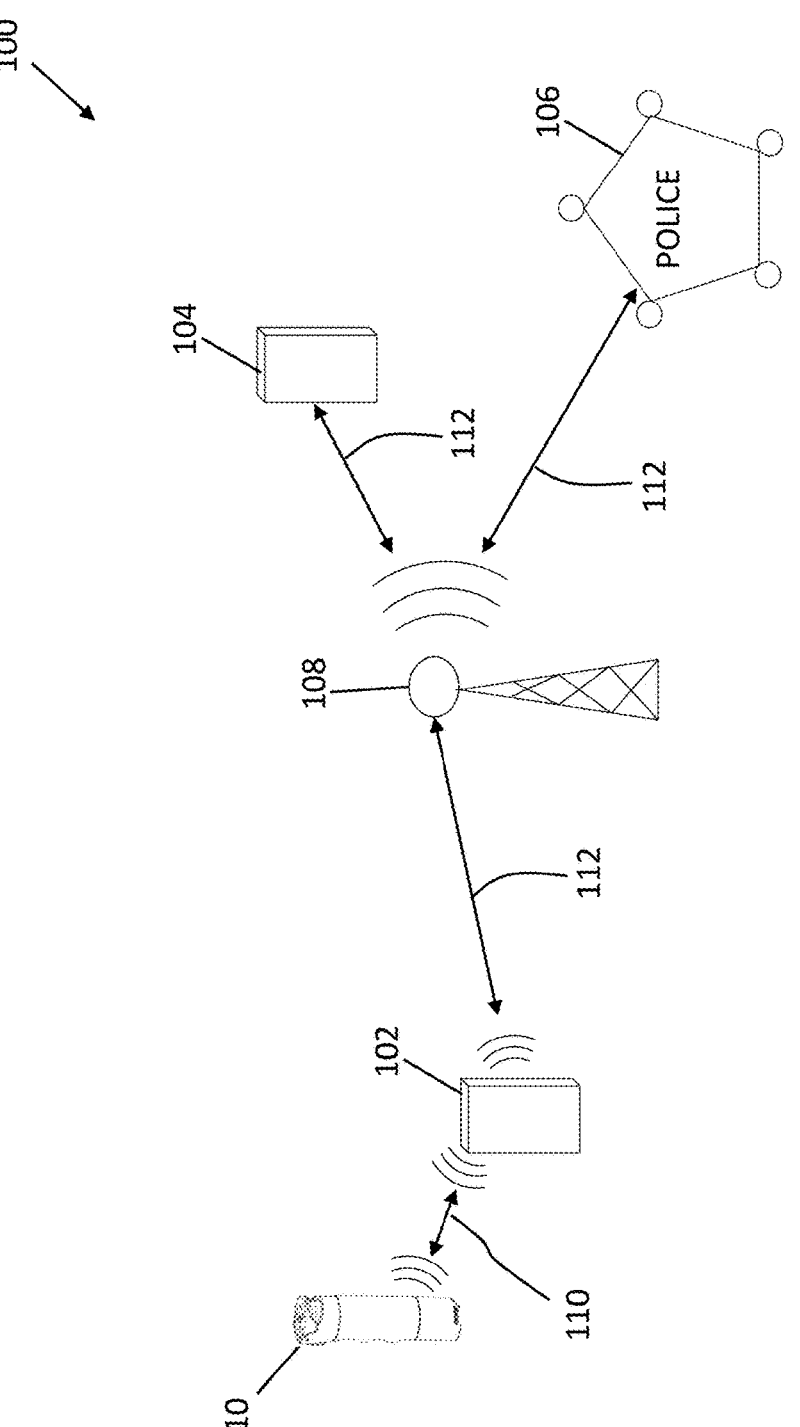
FIG. 3 is a schematic diagram of a personal safety system incorporating the smart personal safety device of FIG. 1.

As shown in FIG. 3, the smart personal safety device 10 is preferably incorporated as part of a personal safety system 100 that is configured to send an alert signal to one or more third parties when the wireless data communication module 12 has been energized which, as discussed above, may occur as a result of the dispensing button 24 of the personal safety device 10 being actuated while the module 12 is mounted to the device 10 or as a result of the push button 38 of the module 12 being actuated while the module 12 is decoupled from the device 10. In the nonlimiting embodiment represented in FIG. 3, the personal safety device 10 wirelessly transmits a triggering signal 110 to a mobile telecommunication device 102, such as a smart phone, when the wireless data communication module 12 is energized, either when attached to the body 14 by depressing the dispensing button 24 to dispense the chemical irritant or when separated from the body 14 by directly depressing the push button 38 on the electronics housing 32. The mobile telecommunication device 102 in turn is programmed, for example with a mobile computer software application program ("mobile app") to send one or more alert signals 112, such as a text, email, telephone call (e.g., "911"), or other alert signal, to one or more remote recipients, such as another telephone 104 of a trusted emergency contact, and/or a police department 106 or other emergency services provider, and/or another third party, via an available telecommunications and/or data network 108. The system 100 may include additional communication links, nodes, and/or communication protocols. For example, the mobile app on the mobile telephone 102 may also or alternatively communicate with a system server and/or call center that in turn communicates with one or more third parties. For example, the personal safety system 100 may function as described in U.S. Pat. No. 11,402,179 to SABRE Security Equipment Corporation, the contents of which are incorporated herein by reference.

FIGS. 4 through 8 represent certain functions of the wireless data communication module 12 that can preferably be implemented with the wireless data communication module 12. The embodiments of FIGS. 4 through 8 and the following descriptions are based on embodiments of the personal safety device 10 and the personal safety system 100 in which the electronic circuitry 34 includes the Bluetooth® transceiver 35 or other type of short-range radio transceiver that can pair and communicate with a mobile telephone 102 or other digital computing device that is configured with one or more sets of program instructions, such as from one or more apps or other type of computer program, to perform various functions as described hereinafter. However, it is understood that any one or more of these specific devices may be substituted with other types of devices capable of performing the same or substantially similar functions.

FIG. 4 illustrates a preferred but nonlimiting method 200 for establishing a dedicated communication link (also called "pairing") between the wireless data communication module 12 and the mobile telephone 102 that runs the mobile app. At 202, the mobile app is opened on the telephone 102 and instructed to establish a dedicated short-range radio communication link (e.g., "pair with Bluetooth®") with a new device. By being dedicated, transmissions on the communication link will not be received by and/or intelligible to other mobile computing devices (e.g., mobile telephones with Bluetooth® transceivers) with which such a dedicated link is not established. At 204, the desired device for pairing is then selected. In this example, the mobile app is then instructed to pair with the personal safety device 10, or more specifically with the wireless data communication module 12 of the personal safety device 10. Next at 206, the wireless data communication module 12 is removed from the body 14 if it is already operatively attached thereto to expose the push button 38 for activation by a user independently of the rest of the personal spray device 10 (e.g., the body 14, top cap 18, dispensing button 24, and optionally cannister 16). Then, at 208, the dome switch 40 is pressed two times in rapid succession, for example by pressing down on the push button 38 with a thumb or finger, to cause the electronic circuitry 34 to enter a pairing mode. In the pairing mode, the electronic circuitry 24 wireless broadcasts a connection request ("pairing request") to any nearby receivers. This may also optionally cause the pairing indicator 46 (such as an LED) on the wireless data communication module 12 to light up, for example, blink, to indicate to the user that the wireless data communication module 12 is in pair mode. Next at 210, the user selects on the mobile app whether to "accept" or "reject" the connection request being sent by the electronic circuitry 34. If the user selects to reject the connection request, at 212 the user instructs the mobile app to reject the connection request so that the mobile app does not establish a communication link with the wireless data communication module 12, whereupon after a predetermined period of time, such as a few seconds or minutes (e.g. thirty seconds to five minutes), the wireless data communication module 12 will enter a sleep mode and the pairing process is ended. On the other hand, if at 210 the user selects to accept the connection request, at 214 the user instructs the mobile app to accept the connection request so as to establish a communication link between the wireless data communication module 12 and the mobile telephone 102. Upon the establishment of the communication link, at 216 the electronic circuitry 34 causes the pairing indicator 46 to provide a visual indicator, for example by emitting a green light, which indicates to the user that the communication link has been successfully established. Next at 218, the user re-attaches the wireless data communication module 12 in its operative position to the lower end 30 of the body 14, for example by screwing the top end of the electronics housing 32 into a threaded connection at the lower end 30 of the body 14. Note, the removable closure 44 is also preferably in its closed configuration at this point. Assuming that a cannister 16 has already been operatively installed within the body 14 and the top cap 18 and dispensing button 24 are in their operative positions, at 220 the personal safety device 10 is ready for use as an operative part of the personal safety system 100 as described hereinafter.

Figure 5:
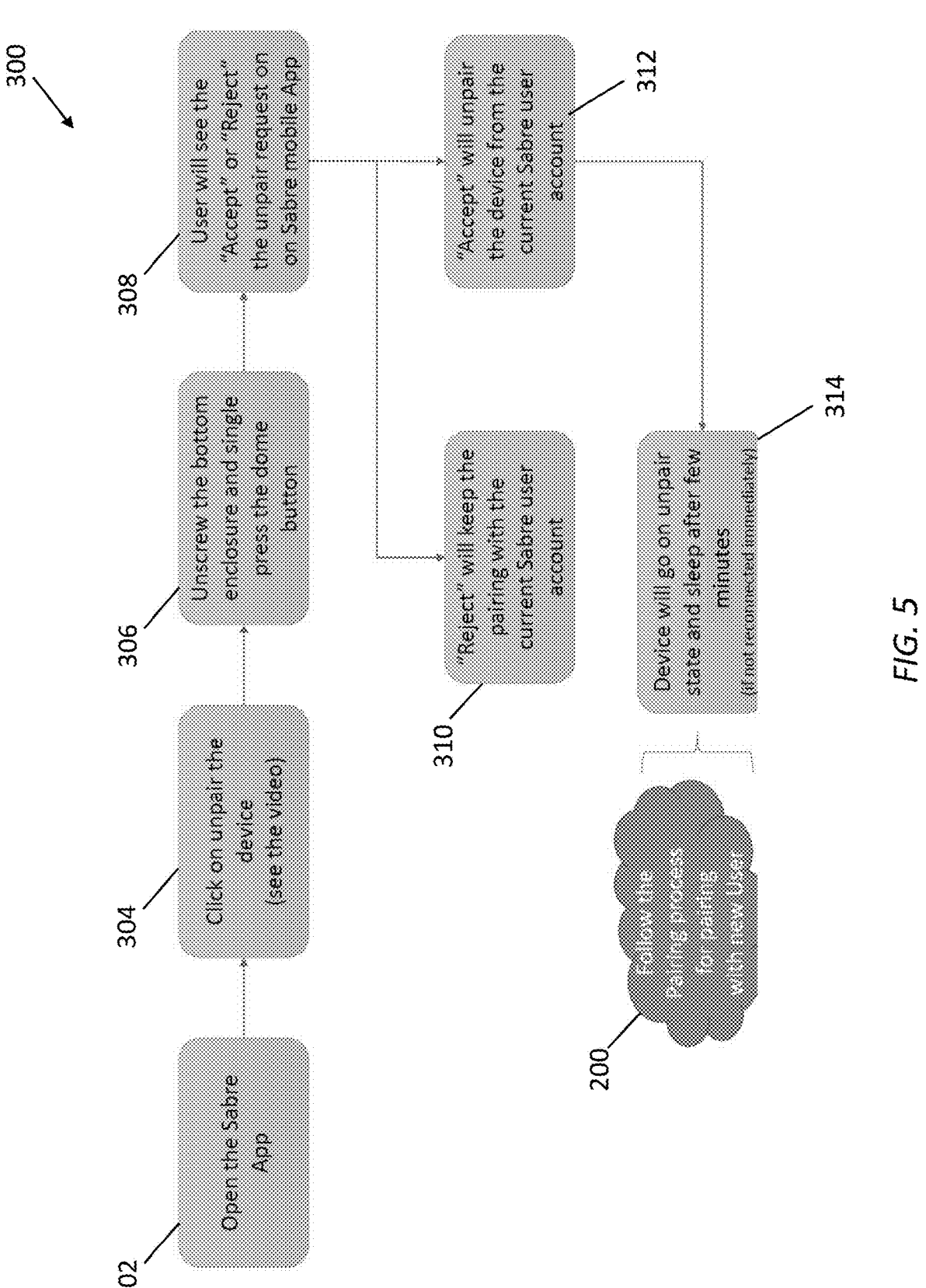
FIG. 5 is a flow chart illustrating steps in an unpairing process for the wireless data communication module of the smart personal safety device of FIG. 1.

FIG. 5 illustrates a preferred but nonlimiting method 300 for severing a previously established communication link (also called "unpairing") between the wireless data communication module 12 and the mobile telephone 102. At 302, the mobile app on the mobile telephone 102 is opened. At 304 the mobile app is instructed to sever the communication link, for example by selecting an "unpair" icon on the mobile telephone 102. Then, at 306 the wireless data communication module 12 is separated from the body 14 (and the rest of the personal safety device 10), for example by unscrewing from the lower end 30, and the dome switch 40 is actuated a single time, for example by pressing the push button 38 with a thumb or finger, to cause the electronic circuitry 34 to enter an unpairing mode that broadcasts a request to sever the communication link (an "unpairing request") to the mobile telephone. Next at 308, in response to the broadcast unpairing request, the mobile telephone provides the user with the choice of whether to accept or reject the unpairing request, and the user decides whether to accept or reject the unpairing request at the mobile telephone 102. If the user instructs the mobile app to reject the unpairing request, then at 310 the unpairing request will be ignored by the mobile app and the communication link will be maintained with the current mobile telephone 102, which maintains the pairing of the wireless data communication module 12 with the account of that user of the personal safety system 100. Alternatively, if the user instructs the mobile app to accept the unpairing request, then at 312 the mobile app severs the communication link with the wireless data communication module 12, which unpairs the wireless data communication module 12 from the account of that user of the personal safety system 100. Thereafter, if the wireless data communication module 12 is not immediately re-paired with the user account on the mobile telephone 102, at 314 the wireless data communication module 12 enter an "unpaired" state and enter a sleep mode in a preselected period of time, such as a few seconds to a few minutes (e.g., about thirty seconds to about ten minutes). The wireless data communication module 12 can then be paired with a different user account, either on the same or a different mobile telephone 102, by repeating the pairing process 200.

Figure 6:
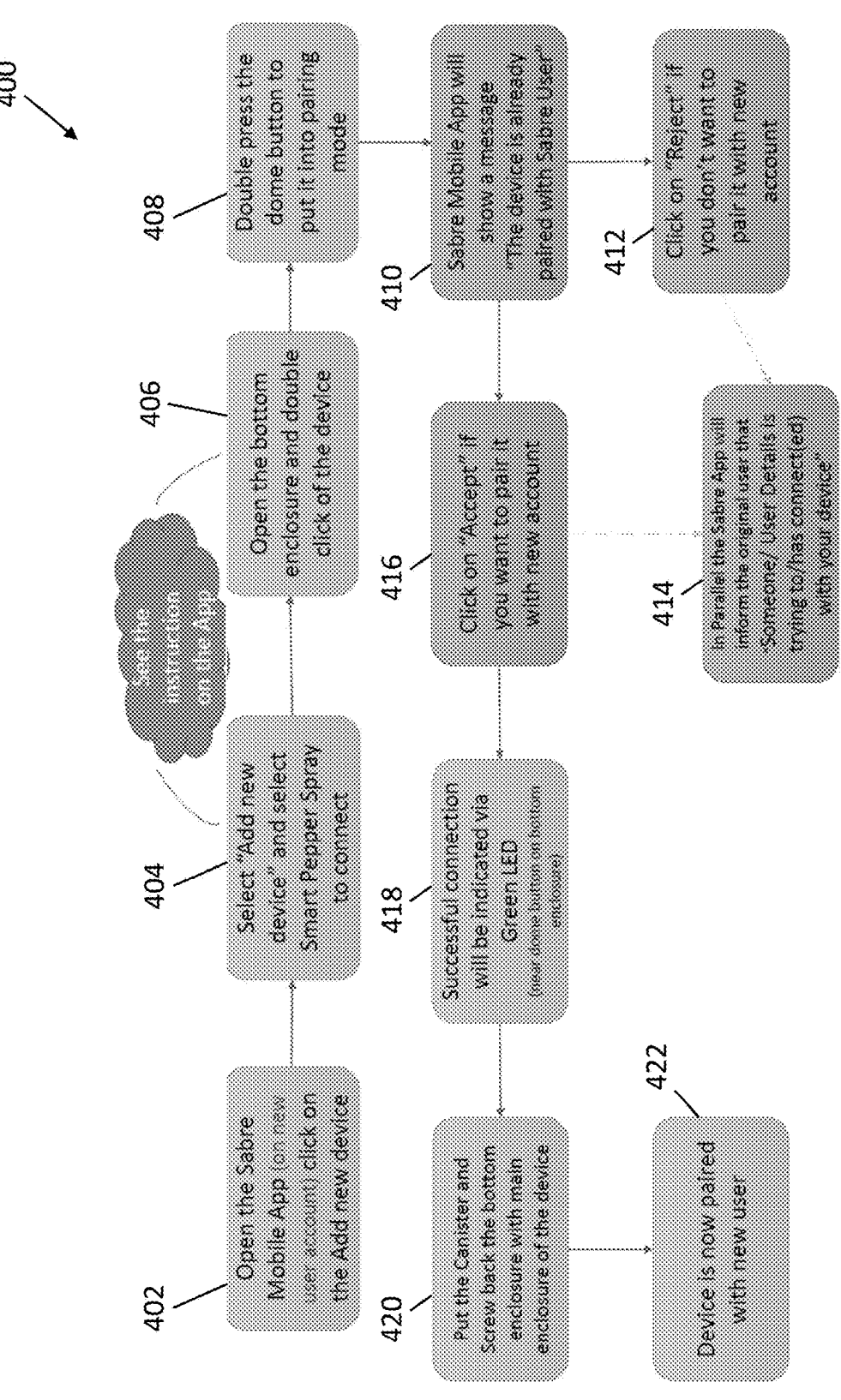
FIG. 6 is a flow chart illustrating steps in a re-pairing process for the wireless data communication module of the smart personal safety device of FIG. 1.

FIG. 6 illustrates a preferred but nonlimiting method of re-pairing the wireless data communication module 12 with a different user account via the mobile app on a different mobile telephone 102 when the wireless data communication module 12 is already paired with a first user account. At 402, the user opens the mobile app for a different user account on the mobile telephone 102 and instructs the mobile app to add a new device, for example, by selecting an icon or button to add a new device. At 404, the user instructs the mobile app to select the personal safety device 10 (e.g., called "Smart Pepper Spray") and instructs the mobile app to pair the telephone 102 with the personal safety device 10. At 406, the wireless data communication module 12 is removed from the body 14 to expose the push button 38 for activation by a user independently of the rest of the personal spray device 10. Then, at 408, the dome switch 40 is pressed two times in rapid succession, for example by double clicking the push button 38, to cause the electronic circuitry 34 to enter a pairing mode, during which the electronic circuitry 24 wireless broadcasts a pairing request to any nearby receivers. At 410, in response to receiving the pairing request, the mobile app shows a message indicating that the wireless data communication module 12 is already paired with a different user account. For example, the mobile app may display the message on a screen of the telephone 102 and provide the user with the options of either accepting the pairing request or rejecting the pairing request. If the user decides to reject the pairing request, at 412 the user instructs the mobile app to reject the pairing request if it is not desired to pair the telephone 102 with a new user account, for example by selecting a "reject" icon or button. Then at 414, the mobile app sends a message to the first user (already paired with the wireless data communication module 12) that another user is trying to connect with the wireless data communication module 12. Thereafter, the pairing mode will end without establishing a communication link with the new telephone and user account. On the other hand, if at 410 the user decides to accept the pairing request, then at 416 the user instructs the mobile app to accept the pairing request, for example by selecting an "accept" icon or button. Then, the mobile app will advance to both 414 to send a message to the first user that another user has connected to the wireless data communication module 12 and at 418 establish a communication link between the new user account and telephone and the wireless data communication module 12. Preferably, the steps 414 and 418 in response to the step 416 occur substantially simultaneously or in relatively rapid succession. At 418, the electronic circuitry 34 of the wireless data communication module 12 preferably causes the pairing indicator 46 to provide an indication for the user to indicate that the wireless data communication module 12 has paired with a telephone 102 and/or user account on the telephone, such as by emitting a green LED light. Once the user has received the indication confirming successful pairing, at 420 the wireless data communication module 12 can be (re) attached in its operative position on the device 10, for example, by screwing into the lower end 30 of the body 14. At 422, wireless data communication module 12 is paired with the new user and the personal safety device 10 is operationally ready for use as part of the personal safety system 200.

FIG. 7 illustrates a preferred but nonlimiting method of using the personal safety device 10 when loaded with a cannister 16 filled with a chemical irritant (e.g., pepper spray) and paired with a user account on a mobile telephone 102 (or other computing device) as part of the personal safety system 100. When the user decides to use the paired personal safety device 10, for example, to discharge the chemical irritant toward a person in response to a perceived or actual threat, at 502 the user lifts the protective cap 28 away from the dispensing button 24 and depresses the dispensing button 24 while aiming the spray nozzle 26 toward the intended target so as to dispense a charge of the chemical irritant toward the intended target at 504. At 505, lifting the protective cap 28 also preferably causes the mobile app to send one or more alert signals to pre-specified contacts indicating that the cap 28 has been lifted. The chemical irritant may be dispensed in the form of a stream, mist, foam, and/or other form depending on the character-istics of the chemical irritant and the spray nozzle 26. At 506, as the cannister 16 is actuated (shifted) toward the lower end 30 in response to the user pressing the dispensing button 24, the cannister 16 triggers the wireless (e.g., Bluetooth®) communication of a triggering signal 110 from the wireless data communication module 12 by pressing downwardly (either directly or indirectly) on the push button 38 an amount sufficient to actuate the dome switch 40. At 508, the wireless data communication module 12 continues to broadcast the triggering signal 110 either until at 512 an acknowledgement signal is received from the paired user account on the paired mobile telephone 102, or until at 510 a predefined period of time (e.g., two to five to ten minutes) elapses without receiving an acknowledgement signal from the paired user account on the paired mobile telephone 102. At 510, if the acknowledgement signal is not received by the end of the predefined period of time, the wireless data communication module 12 automatically stops broadcasting the triggering signal 110 and enters a sleep mode. On the other hand, if the acknowledgement signal is received by the wireless data communication module 12, at 512 the electronic circuitry 34 causes the wireless data communication module 12 to stop broadcasting the triggering signal 110. Subsequently at 514, the mobile app will take further actions to cause one or more alert signals 112 to be sent to pre-specified contacts and/or authorities (e.g., police or security) indicating that an emergency alert has been initiated by the user account. Additional information may be provided and/or additional alert steps and/or mechanisms may be implemented at 514 at least as described in U.S. Pat. No. 11,402,179.

FIG. 8 illustrates a preferred but nonlimiting method of using the personal safety device 10 when loaded with a cannister 16 filled with a chemical irritant (e.g., pepper spray), but not paired with a user account on a mobile telephone 102 (or other computing device) as part of the personal safety system 100. At 602, the user lifts the protective cap 28 away from the dispensing button 24 and depresses the dispensing button 24 while aiming the spray nozzle 26 toward the intended target so as to dispense a charge of the chemical irritant toward the intended target at 604, generally as described above. At 606 as the user presses the dispensing button 24, the cannister 16 triggers the wireless (e.g., Bluetooth®) communication of a triggering signal 110 from the wireless data communication module 12 by pressing downwardly (either directly or indirectly) on the push button 38 an amount sufficient to actuate the dome switch 40, also generally as described above. At 608, the wireless data communication module 12 continues to broadcast the triggering signal 110 either until an acknowledgement signal is received from the paired user account on the paired telephone 102 or until a predetermined period of time (e.g., five minutes) elapses without receiving the acknowledgement signal. If no acknowledgment signal is received by the wireless data communication module 12 within the predetermined period of time, then at 610 the wireless data communication module 12 automatically stops broadcasting the triggering signal 110 and goes into a sleep mode. However, if the acknowledgment signal is received within the predetermined period of time, then at 612 a pairing request is displayed by the mobile telephone 102, at which time the user can pair the wireless data communication module 12 with a user account on the mobile telephone as already described in the method 200.

A benefit of the personal safety device 10 as incorporated into the personal safety system 100 is that the wireless data communication module 12 can send an emergency triggering signal 110 to cause the delivery of one or more alert signals 112 via the mobile computing device 102 even when the wireless data communication module 12 is separated from the remaining components of the personal safety device 10, such as when detached and separated remote from the body 14. To accomplish this, the push button 38 is pushed directly, for example, with a user's thumb or finger, to send the triggering signal 110 over an already established dedicated communication link with the mobile computing device 102 while the wireless data communication module 12 is separated from the body 14. If the wireless data communication module 12 was already attached to the body 14, the user can simply and quickly detach the wireless data communication module 12 from the body 14, for example, by unscrewing the electronics housing 32 from the lower end 30 of the body 14, so that he/she can access the push button 38 directly with a thumb or finger. Thus, for example, if a cannister 16 is not operatively disposed inside the body 14 so as to be able to actuate the push button 38 by depressing the dispensing button 24, the user can still activate the system 100 to send one or more emergency alert signals 112 to third parties by simply removing the wireless data communication module 12 and pressing the push button 28 directly.

As previously noted above, though the foregoing detailed description describes certain aspects of one or more particular embodiments of the invention, alternatives could be adopted by one skilled in the art. For example, the personal safety device 10, personal safety system 100, and their components could differ in appearance and construction from the embodiments described herein and shown in the drawings, functions of certain components of the personal safety device 10 and/or personal safety system 100 could be performed by components of different construction but capable of a similar (though not necessarily equivalent) function, and various materials could be used in the fabrication of the personal safety device 10 and/or personal safety system 100 and/or their components. As such, and again as was previously noted, it should be understood that the invention is not necessarily limited to any particular embodiment described herein or illustrated in the drawings.

The invention claimed is:

1. A smart personal safety device for dispensing a chemical irritant comprising:

a product cannister;

a body in which the product cannister is received;

a first actuation mechanism for dispensing a product from the product cannister received within the body;

a wireless data communication module removably coupled to the body and configured for wirelessly transmitting a triggering signal to a remote receiver; and a second actuation mechanism coupled to the wireless data communication module so as to be removed with the wireless data communication module when the wireless data communication module is separated from the body, the second actuation mechanism being disposed between the body and the wireless data communication module when the wireless data communication module is coupled to the body, the second actuation mechanism being exposed by separating the wireless data communication module from the body, the second actuation mechanism being operable to energize the wireless data communication module to wirelessly transmit the triggering signal when the second actuation mechanism is actuated, the second actuation mechanism being actuated by the product cannister when the wireless data communication module is coupled to the body and the first actuation mechanism is actuated to dispense the product from the product cannister [received within the body, and the second actuation mechanism being exposed when the wireless data communication module is separated from the body for direct activation of the wireless data communication module independently of the body and the first actuation mechanism.

2. The smart personal safety device of claim 1, wherein the wireless data communication module comprises:
   a housing that releasably couples to the body, wherein separating the housing from the body separates the wireless data communication module from the body;
   a wireless signal transmitter carried by the housing; and
   circuitry carried by the housing and configured to cause the wireless signal transmitter to wirelessly transmit the triggering signal when the second actuation mechanism is actuated;
   wherein the second actuation mechanism is accessible on an exterior of the housing to be engaged by a user when the housing is separated from the body to allow the wireless data communication module to be used independently of the body.

3. The smart personal safety device of claim 2, wherein the second actuation mechanism can be engaged by the product cannister inside the body when the housing is coupled to the body.

4. The smart personal safety device of claim 2, wherein the second actuation mechanism comprises a push button accessible on the exterior of the housing.

5. The smart personal safety device of claim 4, wherein the second actuation mechanism further comprises a dome switch coupled to the circuitry and a biasing member operatively disposed to bias the push button and the dome switch away from each other, wherein actuating the push button engages the dome switch after a minimum spring force of the biasing member is overcome.

6. The smart personal safety device of claim 5, wherein the circuitry comprises a first printed circuit board and a second printed circuit board disposed in a stacked configuration inside the housing.

7. The smart personal safety device of claim 1, wherein the wireless data communication module further comprises:
   a power cell; and
   an access door,
   wherein the power cell provides electrical power to the data communication module; and
   wherein the access door can be closed to enclose the power cell inside the data communication module and opened to allow access to the battery from an exterior of the data communication module.

8. The smart personal safety device of claim 2, wherein the wireless signal transmitter comprises a short-range radio frequency transceiver.

9. The smart personal safety device of claim 7, wherein the power cell comprises a battery.

10. A smart personal safety system comprising:
    the smart personal safety device of claim 1; and
    a mobile computing device that can establish a dedicated wireless communication link with the wireless data communication module;
    wherein the mobile computing device executes a program configured to send an alert signal to one or more third parties via a telecommunications and/or data network in response to receiving the triggering signal from the wireless data communication module over the established dedicated wireless communication link.

11. The smart personal safety system of claim 10, wherein the dedicated wireless communication link comprises a dedicated short-range radio frequency link.

12. A method of using the smart personal safety device of claim 1, the method comprising:
    separating the wireless data communication module from the body; and
    actuating the second actuation mechanism to send the triggering signal over an established dedicated communication link with a mobile computing device while the wireless data communication module is separated from the body.

13. A method of using the smart personal safety device of claim 10, the method comprising:
    separating the wireless data communication module from the body; and
    actuating the second actuation mechanism to send the triggering signal over an established dedicated communication link with a mobile computing device while the wireless data communication module is separated from the body.

14. The method of claim 13, further comprising:
    detaching and separating the wireless data communication module from the body; and
    engaging the second actuation mechanism to send a pairing request signal to the mobile computing device with the wireless data communication module separated from the body.

15. The method of claim 14, further comprising accepting the pairing request with the mobile computing device to establish the dedicated wireless communication link.

16. The method of claim 13, further comprising reattaching the wireless data communication module to the body in an operative position that prevents access to the second actuation mechanism from an exterior of the smart personal protection device and allows actuation of the second actuation mechanism with the first actuation mechanism when dispensing the product from the product cannister received within the body.

17. The method of claim 13, further comprising:
    sending a second pairing request signal to a second mobile computing device while the wireless data communication module has an established dedicated wireless communication link with a first mobile computing device; and
    transmitting, in response to the second mobile computing device accepting or rejecting the second pairing request, an information signal to the first mobile computing device to indicate to the first mobile computing device that the second pairing request has been received by the second mobile computing device.

18. The method of claim 17, wherein the information signal indicates whether the second mobile computing device has accepted or rejected the second pairing request.

* * * * *